B. C. FITCH.
STEERING WHEEL AND METHOD OF MAKING SAME.
APPLICATION FILED APR. 24, 1919.

1,311,684.

Patented July 29, 1919.

Witness
A. J. Stenner
L. Thomas

Inventor
Benjamin C. Fitch
By S. E. Thomas
Attorney

UNITED STATES PATENT OFFICE.

BENJAMIN C. FITCH, OF DETROIT, MICHIGAN.

STEERING-WHEEL AND METHOD OF MAKING SAME.

1,311,684.　　　　Specification of Letters Patent.　　Patented July 29, 1919.

Application filed April 24, 1919.　Serial No. 292,504.

*To all whom it may concern:*

Be it known that I, BENJAMIN C. FITCH, citizen of the United States, residing at Detroit, county of Wayne, State of Michigan, have invented a certain new and useful Improvement in Steering-Wheels and Methods of Making Same, and declare the following to be a full, clear, and exact description of the same, such as will enable others skilled in the art to which it pertains to make and use the same, reference being had to the accompanying drawings, which form a part of this specification.

My invention relates to steering wheels shown in the accompanying drawings and more particularly described in the following specification and claim.

The object of this invention is to produce a superior article and to reduce the manufacturing cost;—the device being especially adapted for quantity production.

In the drawings accompanying this specification and forming part thereof:

Referring now to the letters of reference placed upon the drawings:—

A, denotes a rim of wood, paper or other fibrous material provided with recesses B, to receive the ends of the spider arms C, integral with and radiating from the hub D.

Figure 1:
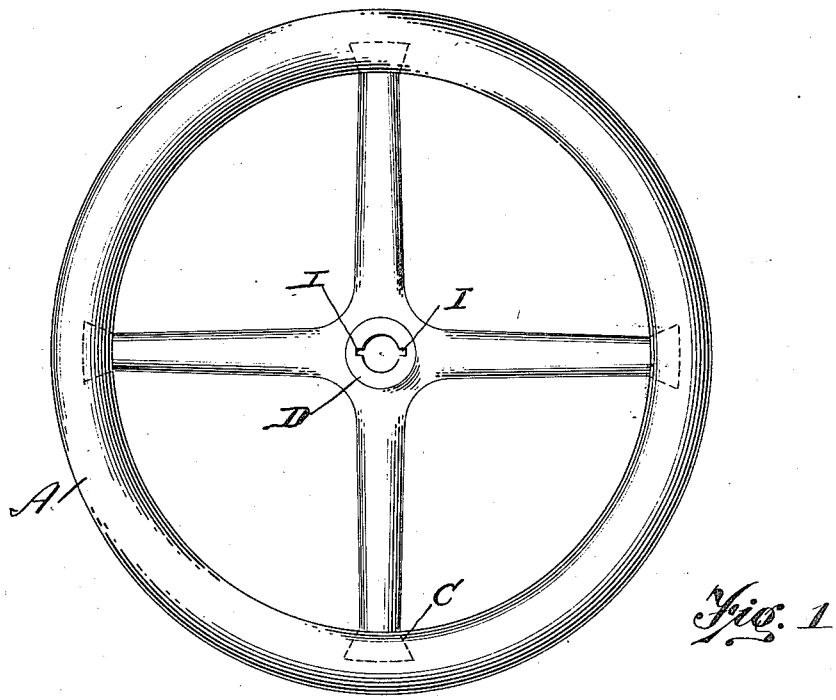
Figure 1 is a plan view of the steering wheel.
Figure 2:
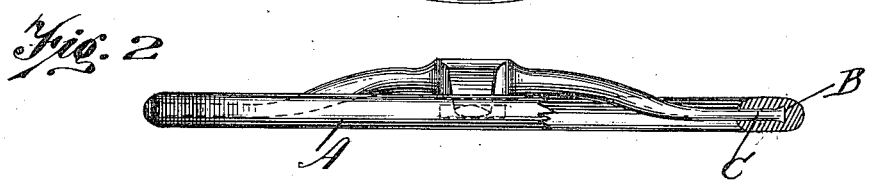
Fig. 2 is a side elevation with part of the rim broken away and in section.
Figure 3:
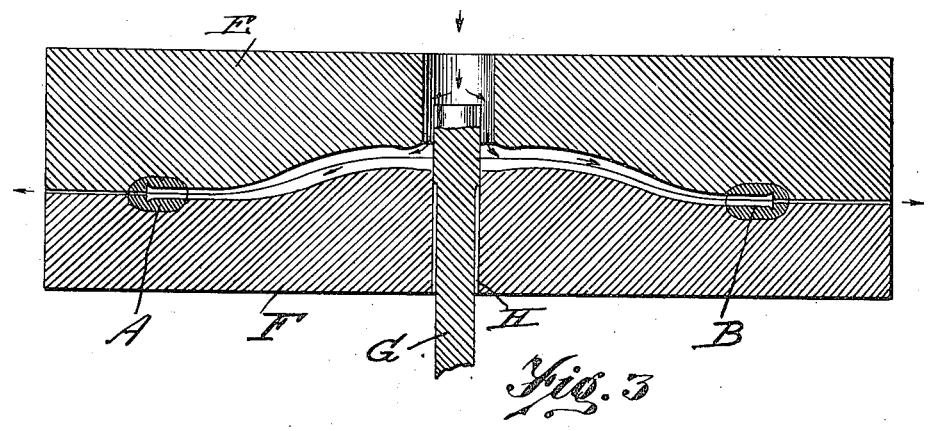
Fig. 3 is a diagrammatic view showing the rim supported in a suitable die adapted to receive under pressure the metal forming the hub and spider of the device.

E and F, indicate respectively the upper and lower portions of a forming die, and G, is a movable core or plunger having fins H, adapted to form the key-ways I, in the hub,—shown in Fig. 1.

The rim is first placed in position between the respective portions of the die, the metal is then poured, under pressure, at such temperature at the hub that when it reaches the periphery it will be fluid enough to take the impression of the die,—the metal setting almost instantly, producing a smooth exterior and dense texture and completely filling the dovetailed cavities in the rim—and also the air relief or vent holes—which in addition to releasing the air from the die—serve when filled with metal as an auxiliary locking means for securing the rim and spider together.

While the metal is in a fluid or viscous condition, the movable core or plunger G, is thrust through the metal at the hub portion, thereby forming a hole to receive the steering wheel shaft (not shown) and the key slots for locking the wheel to the latter.

It will be apparent that a steering wheel constructed as described and shown will be strong and may be rapidly and economically produced;—an essential in quantity production.

Having thus described my invention what I claim is:—

The method of making a steering wheel, consisting in placing a non-metallic rim, having recesses to receive the ends of a metallic supporting spider and hub portion in a suitable die adapted to form a metallic hub with spider arms extending into the respective recesses in the non-metallic rim,—pouring fluid metal into said die, under pressure, whereby it may be forced throughout the die and into the rim to form a metallic supporting spider, with only the ends of its spokes extending into the non-metallic rim, and then forcing a suitable core or plunger through the hub portion while the metal is still in a fluid state, whereby a central bore is provided in the hub portion to receive a shaft.

In testimony whereof, I sign this specification in the presence of two witnesses.

BENJAMIN C. FITCH.

Witnesses:
　S. E. THOMAS,
　JOHN CONSIDINE, Jr.